(12) United States Patent
Nelson

(10) Patent No.: US 12,168,429 B2
(45) Date of Patent: Dec. 17, 2024

(54) BRAKE BOOSTER ASSEMBLY AND PUSHROD-PEDAL COUPLER

(71) Applicant: Robert Bosch GmbH, Stuttgart (DE)

(72) Inventor: Kenneth Nelson, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 580 days.

(21) Appl. No.: 17/478,168

(22) Filed: Sep. 17, 2021

(65) Prior Publication Data
US 2023/0093360 A1    Mar. 23, 2023

(51) Int. Cl.
*B60T 7/06*    (2006.01)
*F16C 11/04*   (2006.01)
*G05G 1/46*    (2008.04)
*B60T 17/08*   (2006.01)

(52) U.S. Cl.
CPC .............. *B60T 7/06* (2013.01); *F16C 11/045* (2013.01); *G05G 1/46* (2013.01); *B60T 17/08* (2013.01)

(58) Field of Classification Search
CPC .. B60T 7/06; B60T 7/065; G05G 1/32; G05G 1/327; G05G 1/323; G05G 1/44; G05G 1/46; F16C 11/045
See application file for complete search history.

(56) References Cited

U.S. PATENT DOCUMENTS

| | | | | |
|---|---|---|---|---|
| 2,805,550 A | * | 9/1957 | Ayers, Jr. ............... | B60T 13/244 92/3 |
| 2,919,773 A | * | 1/1960 | Fong ..................... | B60W 10/04 477/214 |
| 3,220,189 A | * | 11/1965 | Caramanna ............. | B60T 11/06 74/516 |
| 3,388,610 A |   | 6/1968 | Pyle et al. | |
| 3,625,005 A | * | 12/1971 | Saunders et al. ..... | B60T 13/162 74/516 |
| 3,625,112 A | * | 12/1971 | Brown .................. | B60T 13/162 91/469 |

(Continued)

FOREIGN PATENT DOCUMENTS

| | | |
|---|---|---|
| DE | 19534225 | 3/1997 |
| FR | 2867132 | 9/2005 |
| GB | 323471 | 9/1928 |

*Primary Examiner* — Daniel J Wiley
(74) *Attorney, Agent, or Firm* — Maginot, Moore & Beck LLP

(57) ABSTRACT

A brake booster assembly having a brake booster body and a pushrod as well as a pushrod-pedal coupler are provided. The pushrod travels along a pushrod axis when being pushed. The brake booster assembly includes a pushrod-pedal coupler. The pushrod-pedal coupler comprises a pushrod-attachment end arranged on the pushrod and defining a longitudinal axis parallel to the pushrod axis. A pedal-attachment end is configured to be attached to a pedal and having a pedal pivot axis around which the pedal pivots when being pushed. The pedal pivot axis extends across the longitudinal axis. A coupler hinge is arranged between the pushrod-attachment end and the pedal-attachment end and connects the pushrod-attachment end with the pedal-attachment end. The coupler hinge has a coupler hinge axis that extends across the longitudinal axis and the pedal pivot axis. The pedal pivot axis and the coupler hinge axis are offset along the longitudinal axis.

18 Claims, 5 Drawing Sheets

(56) References Cited

U.S. PATENT DOCUMENTS

| | | | | |
|---|---|---|---|---|
| 3,707,075 A | * | 12/1972 | Cripe | B60T 7/04 74/517 |
| 3,858,457 A | * | 1/1975 | Mathues | G05G 1/46 74/516 |
| 3,988,945 A | | 11/1976 | Fasano | |
| 4,022,081 A | | 5/1977 | Dodd et al. | |
| 4,069,722 A | * | 1/1978 | Derrick | B60T 7/06 74/516 |
| 4,205,734 A | * | 6/1980 | Ostrowski | B60T 11/24 60/581 |
| 4,586,590 A | * | 5/1986 | Rishel | B60T 8/26 60/581 |
| 4,655,628 A | * | 4/1987 | Parker | F16C 11/04 403/163 |
| 4,658,660 A | * | 4/1987 | Parker | B60T 13/567 248/222.51 |
| 4,672,860 A | * | 6/1987 | Parker | B60T 7/06 403/354 |
| 5,551,317 A | | 9/1996 | Gautier et al. | |
| 6,152,642 A | * | 11/2000 | Berthold | B60T 7/042 24/669 |
| 6,203,236 B1 | * | 3/2001 | Gautier | B60T 11/18 403/321 |
| 7,100,997 B2 | | 9/2006 | Berthomieu et al. | |
| 9,989,987 B2 | * | 6/2018 | Fujiwara | G05G 1/38 |
| 10,768,656 B1 | | 9/2020 | Kapocs et al. | |
| 2006/0230870 A1 | * | 10/2006 | Fukase | G01L 5/225 74/512 |
| 2007/0193393 A1 | * | 8/2007 | Collins | G05G 1/46 74/512 |
| 2007/0193394 A1 | * | 8/2007 | Collins | G05G 1/46 74/512 |
| 2008/0223171 A1 | * | 9/2008 | Fujiwara | G05G 1/487 74/512 |
| 2008/0250894 A1 | * | 10/2008 | Fujiwara | G01L 5/225 74/514 |
| 2008/0307920 A1 | * | 12/2008 | Fujiwara | G01L 5/225 74/512 |
| 2009/0049932 A1 | * | 2/2009 | Isono | G05G 1/38 73/862.625 |
| 2009/0229402 A1 | * | 9/2009 | Khan | B60T 7/06 74/512 |
| 2010/0186540 A1 | * | 7/2010 | Sugiura | B60T 11/18 74/512 |
| 2011/0290066 A1 | * | 12/2011 | Fujiwara | G05G 1/46 74/514 |
| 2014/0150599 A1 | * | 6/2014 | Fujiwara | B60T 7/042 74/512 |
| 2015/0331442 A1 | * | 11/2015 | Ganguly | B60T 17/00 29/464 |
| 2016/0244033 A1 | * | 8/2016 | Uchida | G05G 1/327 |
| 2020/0039480 A1 | * | 2/2020 | Bartlett | G05G 1/44 |
| 2022/0144225 A1 | * | 5/2022 | Katayama | G05G 1/32 |

\* cited by examiner

BRAKE BOOSTER ASSEMBLY AND PUSHROD-PEDAL COUPLER

TECHNICAL FIELD

This disclosure relates generally to a brake booster assembly and more particularly to a brake booster with a pushrod-pedal coupler.

BACKGROUND

In a brake booster assembly a pushrod-pedal coupler transmits the actuation force of a driver-actuated brake pedal through a pushrod of the brake booster into the brake booster. If the brake pedal and the pushrod are not fully aligned there may be a side load on the pushrod when the brake pedal is being pushed. This could result in a stick slip of the longitudinal movement of the pushrod. The use of a ball type interface between the pushrod and the brake booster may mitigate this effect. But this requires further considerations for example regarding assembly methods and/or injection molded components.

SUMMARY

One aspect of this disclosure is directed to a brake booster assembly having a brake booster body and a pushrod with a pushrod axis along which the pushrod travels when being pushed, the brake booster assembly including a pushrod-pedal coupler, the pushrod-pedal coupler comprising a pushrod-attachment end arranged on the pushrod and defining a longitudinal axis parallel to the pushrod axis; a pedal-attachment end configured to be attached to a pedal and having a pedal pivot axis around which the pedal pivots when being pushed, the pedal pivot axis extending across the longitudinal axis; and a coupler hinge arranged between the pushrod-attachment end and the pedal-attachment end and connecting the pushrod-attachment end with the pedal-attachment end, wherein the coupler hinge has a coupler hinge axis that extends across the longitudinal axis and the pedal pivot axis and wherein the pedal pivot axis and the coupler hinge axis are offset along the longitudinal axis.

In some embodiments, the pedal pivot axis defines a first plane along which the pedal moves when being pushed, wherein the pedal pivot axis is perpendicular to the first plane, and the longitudinal axis and the coupler hinge axis are parallel to the first plane, wherein the coupler hinge axis defines a second plane, wherein the coupler hinge axis is perpendicular to the second plane, and the longitudinal axis and the pedal pivot axis are parallel to the second plane, and wherein the first plane and the second plane are perpendicular to each other.

In some embodiments, the coupler hinge comprises a hinge pin with a hinge pin axis which is aligned with the coupler hinge axis, a first hinge pin bearing arranged on the pedal-attachment end and a second hinge pin bearing arranged on the pushrod-attachment end.

In some embodiments, the first hinge pin bearing is arranged along the longitudinal axis on a first side of a center portion of the pedal-attachment end and a pedal pin bearing for a pin to secure a pedal is arranged on a second side of the center portion of the pedal-attachment end opposite from the first side.

In some embodiments, the first hinge pin bearing is arranged in a hinge knuckle portion of the pedal-attachment end.

In some embodiments, the pedal-attachment end comprises a first prong extending away from the center portion of the pedal-attachment end and parallel to the longitudinal axis, the first prong including a first bore which is a first part of the pedal pin bearing; and a second prong extending away from the center portion of the pedal-attachment end and parallel to the longitudinal axis and the first prong, the second prong including a second bore as a second part of the pedal pin bearing, wherein the first bore and second bore are aligned with each other and the first prong and the second prong are spaced to accommodate a pedal.

In some embodiments, along the longitudinal axis the second hinge pin bearing is arranged on a first side of a center portion of the pushrod-attachment end facing away from the pushrod.

In some embodiments, the pushrod-attachment end comprises a first prong arranged on the first side of the center portion of the pushrod-attachment end and parallel to the longitudinal axis, the first prong including a first bore which is a first part of the second hinge pin bearing; and a second prong arranged on the same side of the center portion of the pushrod-attachment end and parallel to the longitudinal axis and the first prong, the second prong including a second bore which is a second part of the second hinge pin bearing, wherein the first bore and second bore are aligned with each other and the first prong and the second prong of the pushrod-attachment end are spaced apart to accommodate the first hinge pin bearing of the pedal-attachment end.

In some embodiments, the pedal-attachment end is a first clevis comprising two prongs configured to receive a pedal with a pedal pin to secure the pedal to the first clevis and a hinge knuckle opposite the two prongs and receiving a hinge pin of the coupler hinge and wherein the pushrod-attachment end is a second clevis comprising two prongs configured to receive the hinge knuckle of the first clevis and the hinge pin.

In some embodiments, the longitudinal axis intersects with the coupler hinge axis and the pedal pivot axis.

In some embodiments, the pushrod-attachment end of a pushrod-pedal coupler may be an integral part of the pushrod. In other embodiments, the pushrod-pedal coupler may be a separate component from the pushrod but attached to the pushrod. Such a separate pushrod-coupler comprises a pushrod-attachment end configured to be attached to a pushrod and defining a longitudinal axis to be aligned in a parallel manner with a pushrod axis of the pushrod along which the pushrod travels when being pushed; a pedal-attachment end configured to be attached to a pedal and having a pedal pivot axis around which the pedal pivots when being pushed, the pedal pivot axis extending across the longitudinal axis; and a coupler hinge arranged between the pushrod-attachment end and the pedal-attachment end and connecting the pushrod-attachment end with the pedal-attachment end, wherein the coupler hinge has a coupler hinge axis that extends across the longitudinal axis and the pedal pivot axis and wherein the pedal pivot axis and the coupler hinge axis are offset along the longitudinal axis.

The above aspects of this disclosure and other aspects will be explained in greater detail below with reference to the attached drawings.

DETAILED DESCRIPTION

The illustrated embodiment is disclosed with reference to the drawings. However, it is to be understood that the disclosed embodiment is intended to be merely an example that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
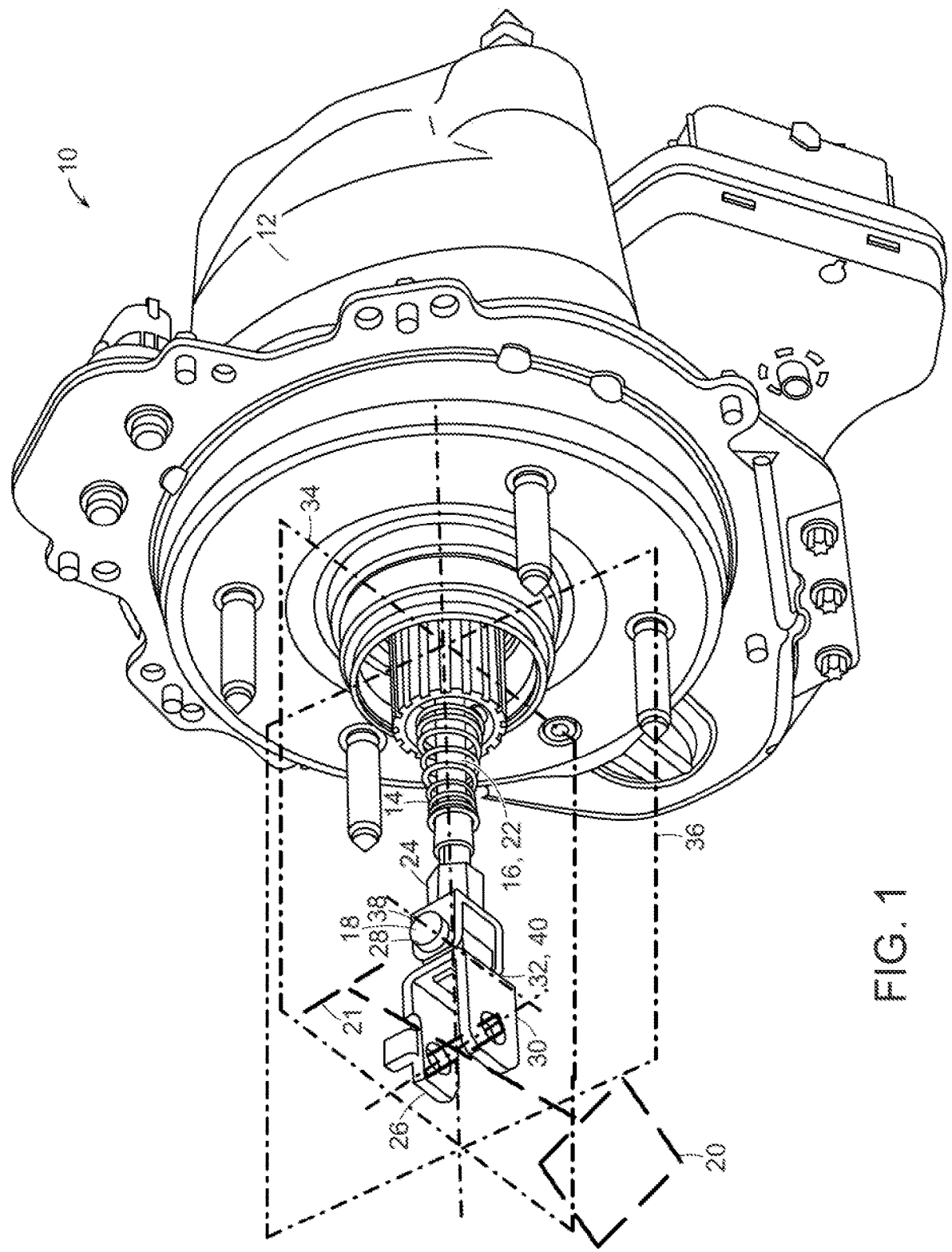
FIG. 1 is a first perspective view of a brake booster assembly and a first embodiment of a pushrod-pedal coupler.
Figure 2:
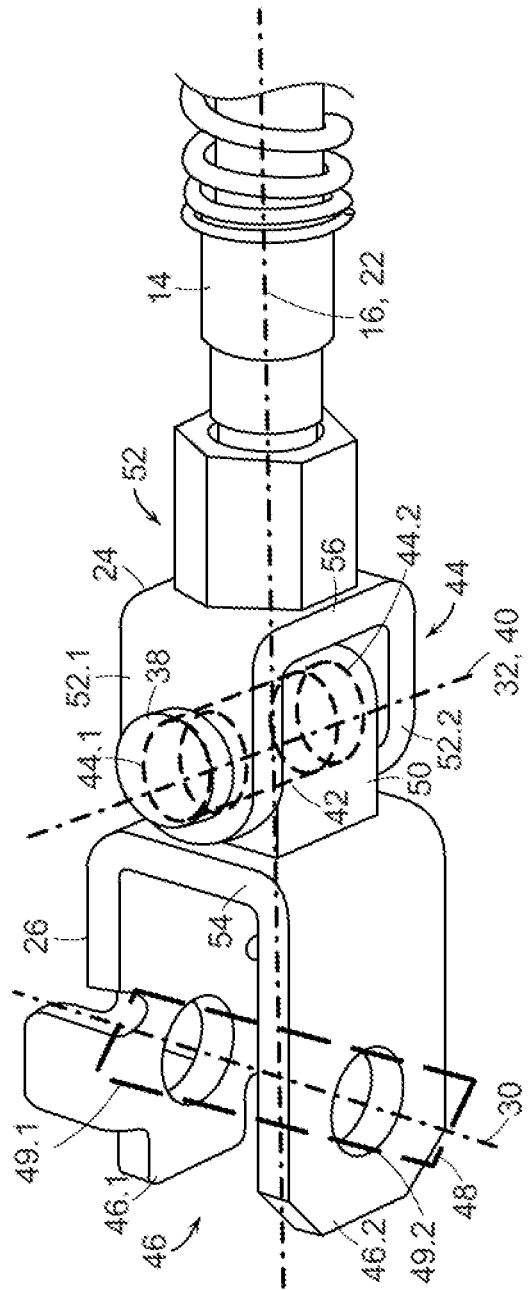
FIG. 2 is a second perspective view of the pushrod-pedal coupler of FIG. 1.

FIGS. 1 and 2 illustrate a brake booster assembly 10. The brake booster assembly 10 comprises a brake booster body 12 and a pushrod 14. The pushrod 14 has a pushrod axis 16 along which the pushrod 14 travels when being pushed by a driver. The brake booster assembly 10 further includes a first embodiment of a pushrod-pedal coupler 18 which is attached to the pushrod 14. The pushrod-pedal coupler 18 couples the pushrod 14 to a brake pedal 20 (shown in dashed lines). The brake pedal 20 is pivotally connected to a vehicle body (not shown) with a body-pedal pivot 21 (shown in dashed lines). The pushrod-pedal coupler 18 may also be used with other types of assemblies for example clutch or accelerator assemblies. In those cases a pushrod may be connected to a clutch or accelerator pedal.

The pushrod-pedal coupler 18 defines a longitudinal axis 22 that is, as shown in FIG. 1, aligned with the pushrod axis 16. Besides being parallel and aligned with each other the longitudinal axis 22 and pushrod axis 16 may be parallel and radially offset to each other. The pushrod-pedal coupler 18 may be configured to transmit axial forces rather than rotational torque.

The pushrod-pedal coupler 18 comprises a pushrod-attachment end 24 and a pedal-attachment end 26 that are connected to each other with a coupler hinge 28. The pushrod-attachment end 24 is arranged on the pushrod 14. The pushrod-pedal coupler 18 has an internal threaded pushrod-attachment end 24 connected to an external threaded portion of the pushrod 14 (not shown). An outside section around the internal threaded pushrod-attachment end has the shape of a hexagon nut so it can be engaged with a fastening tool. The pushrod-attachment end 24 and the pushrod 14 are rigidly connected. The pushrod-attachment end 24 and the pushrod 14 may be separate parts as shown or integral. They may be integral if the diameter of the pushrod 14 is sufficiently thick to accommodate the coupler hinge 28.

The pedal-attachment end 26 is attached or is configured to be attached to the brake pedal 20 by having a pedal pivot axis 30 around which the brake pedal 20 pivots when being pushed. The pedal pivot axis 30 extends across the longitudinal axis 22. The coupler hinge 28 is arranged between the pushrod-attachment end 24 and the pedal-attachment end 26 and connects the pushrod-attachment end 24 with the pedal-attachment end 26. The coupler hinge 28 has a coupler hinge axis 32 that extends across the longitudinal axis 22 and the pedal pivot axis 30. The pedal pivot axis 30 and the coupler hinge axis 32 are offset along the longitudinal axis 22.

The pedal pivot axis 30 defines a first plane 34 along which the brake pedal 20 moves when being pushed. The first plane 34 has a generally vertical orientation. The pedal pivot axis 30 is perpendicular to the first plane 34. The longitudinal axis 22 and the coupler hinge axis 32 are parallel to the first plane 34. As illustrated, the longitudinal axis 22 and the coupler hinge axis 32 are both within the first plane 34 and therefore parallel to the first plane 34. This also means that the longitudinal axis 22 and the coupler hinge axis 32 intersect. As shown in the drawing, they intersect with each other and are also perpendicular to each other. But they may also be parallel to each other and arranged at the same distance or different distances to the first plane 34.

The coupler hinge axis 32 defines a second plane 36. The second plane 36 has a generally horizontal orientation. The coupler hinge axis 32 is perpendicular to the second plane 36. The longitudinal axis 22 and the pedal pivot axis 30 are parallel to the second plane 36. The longitudinal axis 22 and the pedal pivot axis 30 are both within the second plane 36 and therefore parallel to the second plane 36. This also means that the longitudinal axis 22 and the pedal pivot axis 30 intersect. As shown in the drawing, they intersect with each other and are also perpendicular to each other. But they may also be parallel to each other and arranged at the same distance or different distances to the second plane 36.

The first plane 34 and the second plane 36 are perpendicular to each other. Perpendicular in this disclosure includes an angle of 90° but due to tolerances an angle between 85° and 95° is also considered perpendicular. Likewise, parallel in this disclosure also may comprise an angle of up to 5° between axes, between axes and planes, and between planes.

The coupler hinge 28 comprises a hinge pin 38 with a hinge pin axis 40 which is aligned with the coupler hinge axis 32. The coupler hinge 28 further comprises a first hinge pin bearing 42 which is arranged on the pedal-attachment end 26 and a second hinge pin bearing 44 consisting of two hinge pin bearing parts 44.1, 44.2 arranged on the pushrod-attachment end 24. The hinge pin bearing parts 42, 44.1, 44.2 are shown in dashed lines.

The pedal-attachment end 26 is a first clevis 46 or yoke comprising two prongs 46.1, 46.2 configured to receive the brake pedal 20 with a pedal pin 48 (shown in dashed lines) to secure the brake pedal 20 to the first clevis 46. The first prong 46.1 comprises a first pedal pin bearing 49.1 or bore and the second prong 46.2 comprises a second pedal pin bearing 49.2 or bore for the pedal pin 48. The prongs 46.1, 46.2 are parallel to each other and spaced apart to accommodate the brake pedal 20. The pedal pin bearings 49.1, 49.2 or bores are aligned with each other. The first hinge pin bearing 42 on the pedal-attachment end 26 is a hinge knuckle 50 opposite the two prongs 46.1, 46.2 and receiving a middle portion of the hinge pin 38 of the coupler hinge 28. A single prong 46.1 with a first pedal pin bearing 49.1 may be sufficient. The pedal-attachment end 26 may therefore comprise at least one prong 46.1 with a pedal pin bearing 49.1.

When viewed along the longitudinal axis 22, the first hinge pin bearing 42 with the hinge knuckle 50 is arranged on a first side of a center portion 54 of the pedal-attachment end 26 which faces the pushrod-attachment end 24. The pedal pin bearing 49.1, 49.2 for the pedal pin 48 to secure the brake pedal 20 is arranged on a second side of the center portion 54 of the pedal-attachment end 26 opposite from the first side or facing away from the pushrod-attachment end 24. The second hinge pin bearings 44.1, 44.2 on the pushrod-attachment end 24 are arranged on a first side of a center portion 56 of the pushrod-attachment end 24 and face away from the pushrod 14.

The pushrod-attachment end 24 is a second clevis 52 or yoke comprising two prongs 52.1, 52.2 configured to receive the hinge knuckle 50 of the first clevis 46 or the pedal-attachment end 26 and the ends of the hinge pin 38. The first hinge pin bearing 42 is therefore arranged on the pedal-attachment end 26 and the second hinge pin bearing 44 is arranged on the pushrod-attachment end 24. The second hinge pin bearing 44 is arranged on one side of a center portion 56 of the pushrod-attachment end 24 facing away from the pushrod 14. The first prong 52.1 of the pushrod-attachment end 24 is also arranged on the one side of the center portion 56 of the pushrod-attachment end 24 and parallel to the longitudinal axis 22. The first prong 52.1 includes a bore which is the first part of the second hinge pin bearing 44. The second prong 52.2 is also arranged on the one side of the center portion 56 of the pushrod-attachment end 24 and parallel to the longitudinal axis 22 and the first prong 52.1. The second prong 52.2 includes a second bore which is a second part of the second hinge pin bearing 44. The first bore and second bore are aligned with each other and the first prong 52.1 and the second prong 52.2 of the pushrod-attachment end 24 are spaced to accommodate the first hinge pin bearing 42 or hinge knuckle 50 of the pedal-attachment end 26. A single prong 52.1 with a first hinge pin bearing 44.1 may be sufficient. The pushrod-attachment end 24 may therefore comprise at least one prong 52.1 with a hinge pin bearing 44.1.

For assembly in a vehicle, the pushrod-pedal coupler 18 may already be attached to the pushrod 14 of the brake booster when delivered from a brake booster supplier. The brake booster assembly 10 is attached on the outside of a cabin of the vehicle, typically a firewall, with the pushrod 14 reaching into the cabin. The brake pedal 20 is then attached to the brake booster assembly 10 via the pushrod-pedal coupler 18. If the hole in the cabin for the pushrod 14 is not large enough for the pushrod-pedal coupler 18 to pass through the pushrod-pedal coupler 18 may be attached to both the pushrod 14 and the brake pedal 20 after the brake booster assembly 10 is attached to the cabin.

Figure 3:
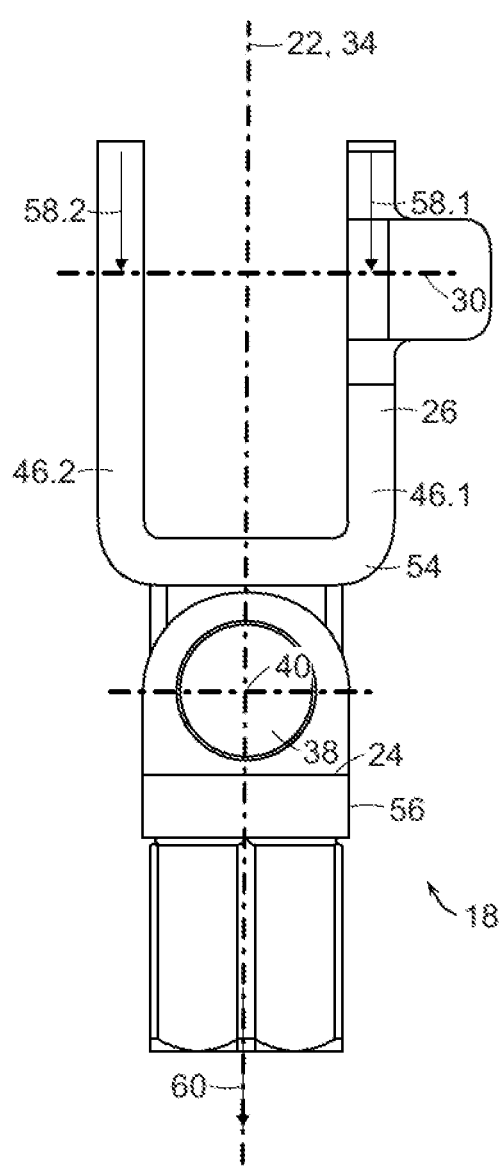
FIG. 3 is a first top view of the pushrod-pedal coupler of FIG. 1.
Figure 4:
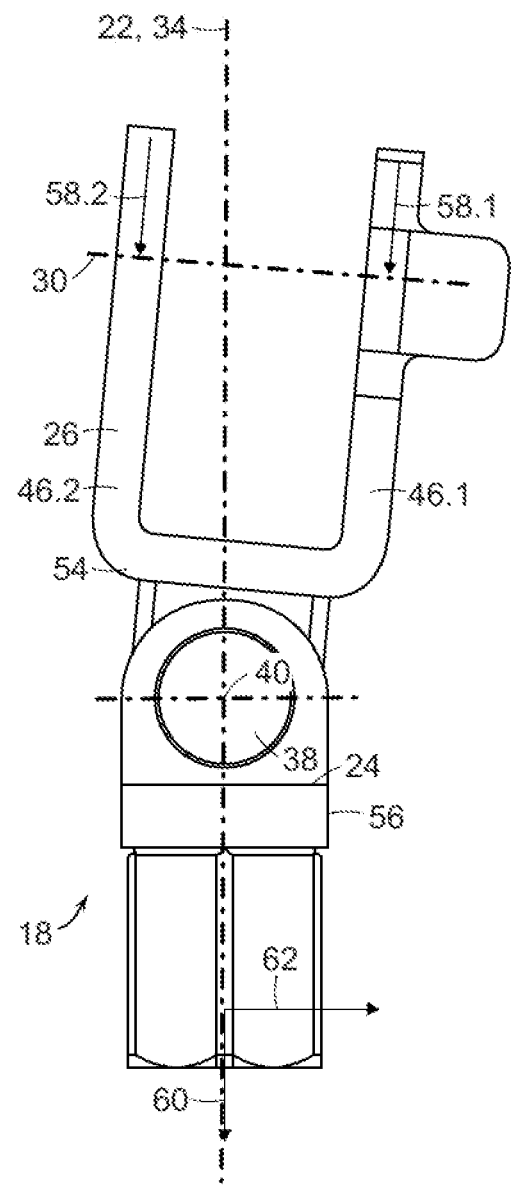
FIG. 4 is a second top view of the pushrod-pedal coupler of FIG. 1.

FIGS. 3 and 4 show different alignments of the pushrod-pedal coupler 18. In FIG. 3 the pushrod-pedal coupler 18 is completely straight. When the brake pedal 20 (not shown) is pushed some of the force (indicated with a first arrow 58.1) travels through the first prong 46.1 and some of the force (indicated with a second arrow 58.2) travels through the first prong 46.2 of the pedal-attachment end 26. The force then gets transmitted through the coupler hinge 28 and the pushrod-attachment end 24 to the pushrod 14 and the brake booster assembly 10 as indicated by arrow 60. When, as shown in FIG. 4, the pushrod-pedal coupler 18 is not completely straight because for example the brake pedal 20 is slightly offset from the pushrod axis 16 a small side load or side force (indicated with arrow 62) is created. Due to the coupler hinge 28 of the pushrod-pedal coupler 18 this side load is smaller compared to a pedal-pushrod axis without a coupler hinge 28 described which in turn reduces a risk of stick-slip of the pushrod 14. The replacement of transmitted torque moment loads with 'two force member' kinematic behaviors mitigates deflection or displacement based tangent force transmission.

Figure 5:
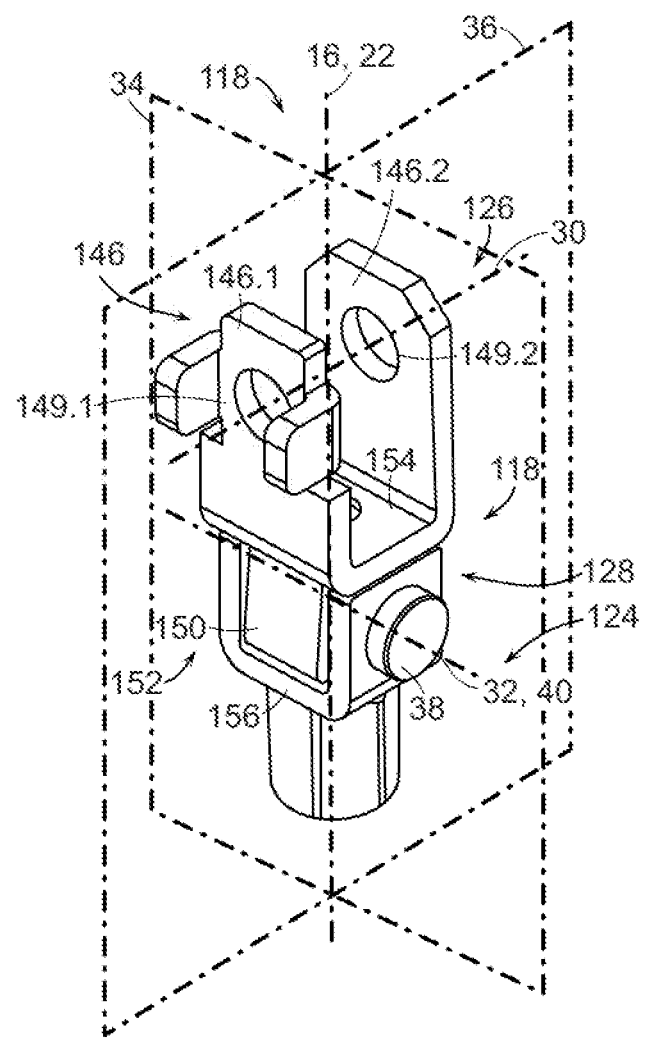
FIG. 5 is a first perspective view of a second embodiment of a pushrod-pedal coupler.
Figures 6, 7:
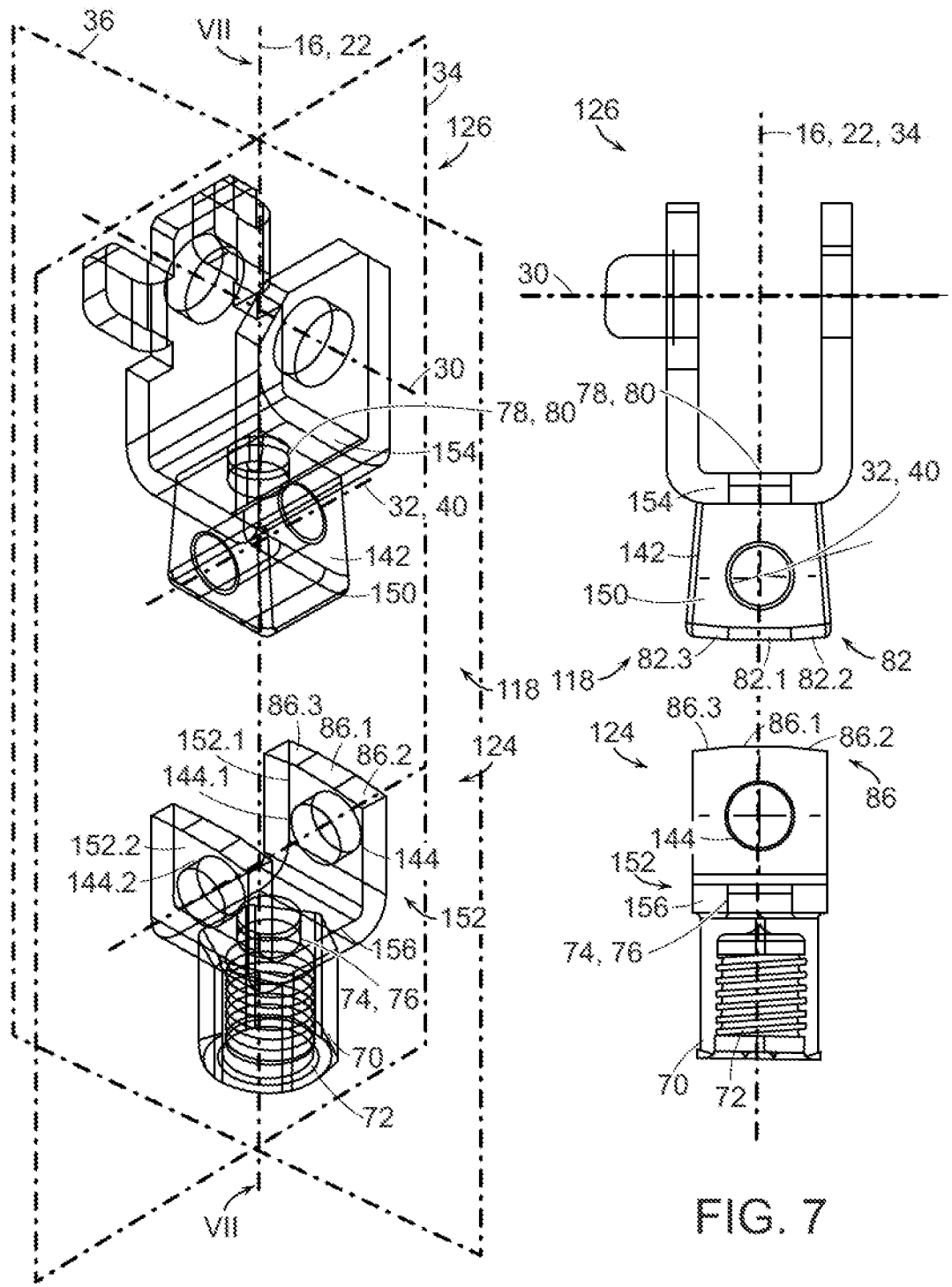
FIG. 6 is an exploded view of a wireframe model of the second embodiment from a different viewpoint.
FIG. 7 is a cross section of the second embodiment along lines VII-VII in FIG. 6.

FIGS. 5, 6 and 7 show a second embodiment of a pushrod-pedal coupler 181. Items with the same reference numbers as those of the first embodiment are identical. Items with a 3-digit or 4-digit reference number starting with a 1 are similar to those of the first embodiment.

The pushrod-pedal coupler 118 comprises a pushrod-attachment end 124 and a pedal-attachment end 126 that are connected to each other with a coupler hinge 128. The pushrod-attachment end 124 can be arranged on the pushrod 14. The pushrod-pedal coupler 118 has a pushrod-attachment end portion 70 with an internal thread 72 connected to an external threaded portion of the pushrod 14 (not shown). An outside section around the pushrod-attachment end portion 70 has the shape of a hexagon nut so it can be engaged with a fastening tool. The pushrod-attachment end portion 70 has a pin 74 which is pressed into a bore 76 of a center portion 156 of the pushrod-attachment end 124. This connection might also be welded to additionally secure the parts. The pushrod-attachment end 124 and the pushrod 14 are rigidly connected. The pushrod-attachment end 124 and the pushrod 14 may also be separate parts as shown or integral.

The pedal-attachment end 126 is configured to be attached to the brake pedal 20 by having a pedal pivot axis 30 around which the brake pedal 20 pivots when being pushed. The coupler hinge 128 has a coupler hinge axis 32 that extends across the longitudinal axis 22 and the pedal pivot axis 30. The pedal pivot axis 30 of this embodiment also defines a first plane 34 along which the brake pedal 20 moves when being pushed. The coupler hinge axis 32 also defines a second plane 36.

The coupler hinge 128 comprises a hinge pin 38 with a hinge pin axis 40 which is aligned with the coupler hinge axis 32. The coupler hinge 28 further comprises a first hinge pin bearing 142 which is arranged on the pedal-attachment end 126 and a second hinge pin bearing 144 consisting of two hinge pin bearing parts 144.1, 144.2 arranged on the pushrod-attachment end 124.

The pedal-attachment end 126 is also a first clevis 146 or yoke comprising two prongs 146.1, 146.2 configured to receive the brake pedal 20 with a pedal pin (not shown in this embodiment) to secure the brake pedal 20 to the first clevis 146. The first prong 146.1 comprises a first pedal pin bearing 149.1 or bore and the second prong 146.2 comprises a second pedal pin bearing 149.2 or bore for the pedal pin. The first hinge pin bearing 142 on the pedal-attachment end 126 is a hinge knuckle 150 opposite the two prongs 146.1, 146.2 and receiving a middle portion of the hinge pin 38 of the coupler hinge 128.

When viewed along the longitudinal axis 22, the first hinge pin bearing 142 with the hinge knuckle 150 is also arranged on a first side of a center portion 154 of the pedal-attachment end 126 which faces the pushrod-attachment end 124. The hinge knuckle 150 has a pin 78 with which it is pressed into a bore 80 of the center portion 154. The pedal pin bearing 149.1, 149.2 for the pedal pin to secure the brake pedal 20 are also arranged on a second side of the center portion 154 of the pedal-attachment end 126 opposite from the first side or facing away from the pushrod-attachment end 124. The second hinge pin bearings 144.1, 144.2 on the pushrod-attachment end 124 are arranged on a first side of a center portion 156 of the pushrod-attachment end 124 and face away from the pushrod 14.

The pushrod-attachment end 124 is also a second clevis 152 or yoke comprising two prongs 152.1, 152.2 configured to receive the hinge knuckle 150 of the first clevis 146 or the pedal-attachment end 126 and the ends of the hinge pin 38.

The first hinge pin bearing 142 is therefore also arranged on the pedal-attachment end 126 and the second hinge pin bearing 144 is arranged on the pushrod-attachment end 124. The second hinge pin bearing 144 is arranged on one side of a center portion 156 of the pushrod-attachment end 124 facing away from the pushrod 14. The first prong 152.1 of the pushrod-attachment end 124 is also arranged on the one side of the center portion 156 of the pushrod-attachment end 124 and parallel to the longitudinal axis 22. The first prong 152.1 also includes a bore which is the first part of the second hinge pin bearing 144. The second prong 152.2 is also arranged on the one side of the center portion 156 of the pushrod-attachment end 124 and parallel to the longitudinal axis 22 and the first prong 152.1. The second prong 152.2 includes a second bore which is a second part of the second hinge pin bearing 144. The first bore and second bore are aligned with each other and the first prong 152.1 and the second prong 152.2 of the pushrod-attachment end 124 are spaced to accommodate the first hinge pin bearing 142 or hinge knuckle 150 of the pedal-attachment end 126.

A surface 82 of the hinge knuckle 150 facing the center portion 156 of the pushrod-attachment end 124 has a middle portion 82.1 that is perpendicular to the first plane 34 and the second plane 36. The surface 82 has two side portions 82.2, 82.3 on either side of the middle portion 82.1 and opposite to each other with respect to the first plane 34. The two side portions 82.2, 82.3 each enclose an angle of 85° with the first plane 34. This limits the angular side movement of the pedal-attachment end 126 away from the first plane 34 to +/−5° before either side portion 82.2, 82.3 touches the center portion 156 of the pushrod-attachment end 124. In case this angle is exceeded, it may cause additional wear on the surfaces touching each other which can be seen during an inspection.

Alternatively or in addition to the angular side movement limiting portions 82.2, 82.3, one or each prong 152.1, 152.2 facing the center portion 154 of the pedal-attachment end 126 has a surface 86. The surface 86 has a middle portion 86.1 that is perpendicular to the first plane 34 and the second plane 36. The surface 86 has two side portions 86.2, 86.3 on either side of the middle portion 86.1 and opposite to each other with respect to the first plane 34. The two side portions 86.2, 86.3 each enclose an angle of 85° with the first plane 34. This limits the side movement of the pedal-attachment end 126 away from the first plane 34 to +/−5° before either side portion 86.2, 86.3 touches the center portion 154 of the pedal-attachment end 126. It may be sufficient to only have the side portions 86.2, 86.3 on one prong 152.1, 152.2.

What is claimed is:

1. A brake booster assembly having a brake booster body and a pushrod with a pushrod axis along which the pushrod travels when being pushed, the brake booster assembly including a pushrod-pedal coupler, the pushrod-pedal coupler comprising
   a pushrod-attachment end arranged on the pushrod and defining a longitudinal axis parallel to the pushrod axis;
   a pedal-attachment end configured to be attached to a pedal and having a pedal pivot axis around which the pedal pivots when being pushed, the pedal pivot axis extending across the longitudinal axis;
   a coupler hinge arranged between the pushrod-attachment end and the pedal-attachment end and connecting the pushrod-attachment end with the pedal-attachment end, wherein the coupler hinge has a coupler hinge axis that extends across the longitudinal axis and the pedal pivot axis and wherein the pedal pivot axis and the coupler hinge axis are offset along the longitudinal axis;
   wherein the pedal pivot axis defines a first plane along which the pedal moves when being pushed, wherein the pedal pivot axis is perpendicular to the first plane, and the longitudinal axis and the coupler hinge axis are parallel to the first plane, wherein the coupler hinge axis defines a second plane, wherein the coupler hinge axis is perpendicular to the second plane, and the longitudinal axis and the pedal pivot axis are parallel to the second plane, and wherein the first plane and the second plane are perpendicular to each other.

2. The brake booster assembly according to claim 1, wherein the coupler hinge comprises a hinge pin with a hinge pin axis which is aligned with the coupler hinge axis, a first hinge pin bearing arranged on the pedal-attachment end and a second hinge pin bearing arranged on the pushrod-attachment end.

3. The brake booster assembly according to claim 2, wherein along the longitudinal axis the first hinge pin bearing is arranged on a first side of a center portion of the pedal-attachment end and a pedal pin bearing for a pin to secure a pedal is arranged on a second side of the center portion of the pedal-attachment end opposite from the first side.

4. The brake booster assembly according to claim 3, wherein the first hinge pin bearing is arranged in a hinge knuckle portion of the pedal-attachment end.

5. The brake booster assembly according to claim 3, wherein the pedal-attachment end comprises a first prong extending away from the center portion of the pedal-attachment end and parallel to the longitudinal axis, the first prong including a first bore which is a first part of the pedal pin bearing; and a second prong extending away from the center portion of the pedal-attachment end and parallel to the longitudinal axis and the first prong, the second prong including a second bore as a second part of the pedal pin bearing, wherein the first bore and the second bore are aligned with each other and the first prong and the second prong are spaced apart to accommodate a pedal.

6. The brake booster assembly according to claim 2, wherein along the longitudinal axis the second hinge pin bearing is arranged on a first side of a center portion of the pushrod-attachment end facing away from the pushrod.

7. The brake booster assembly according to claim 6, wherein the pushrod-attachment end comprises a first prong arranged on the first side of the center portion of the pushrod-attachment end and parallel to the longitudinal axis, the first prong including a first bore which is a first part of the second hinge pin bearing; and a second prong arranged on the first side of the center portion of the pushrod-attachment end and parallel to the longitudinal axis and the first prong, the second prong including a second bore which is a second part of the second hinge pin bearing, wherein the first bore and second bore are aligned with each other and the first prong and the second prong of the pushrod-attachment end are spaced apart to accommodate the first hinge pin bearing arranged on the pedal-attachment end.

8. The brake booster assembly according to claim 1, wherein the pedal-attachment end is a first clevis comprising two prongs configured to receive a pedal with a pedal pin to secure the pedal to the first clevis and a hinge knuckle opposite the two prongs and receiving a hinge pin of the coupler hinge and wherein the pushrod-attachment end is a second clevis comprising two prongs configured to receive the hinge knuckle of the first clevis and the hinge pin.

9. The brake booster assembly according to claim 1, wherein the longitudinal axis intersects with the coupler hinge axis and the pedal pivot axis.

10. A pushrod-pedal coupler comprising
a pushrod-attachment end configured to be attached to a pushrod and defining a longitudinal axis to be aligned in a parallel manner with a pushrod axis of the pushrod along which the pushrod travels when being pushed;
a pedal-attachment end configured to be attached to a pedal and having a pedal pivot axis around which the pedal pivots when being pushed, the pedal pivot axis extending across the longitudinal axis;
a coupler hinge arranged between the pushrod-attachment end and the pedal-attachment end and connecting the pushrod-attachment end with the pedal-attachment end, wherein the coupler hinge has a coupler hinge axis that extends across the longitudinal axis and the pedal pivot axis and wherein the pedal pivot axis and the coupler hinge axis are offset along the longitudinal axis;
wherein the pedal pivot axis defines a first plane along which the pedal moves when being pushed, wherein the pedal pivot axis is perpendicular to the first plane, and the longitudinal axis and the coupler hinge axis are parallel to the first plane, wherein the coupler hinge axis defines a second plane, wherein the coupler hinge axis is perpendicular to the second plane, and the longitudinal axis and the pedal pivot axis are parallel to the second plane, and wherein the first plane and the second plane are perpendicular to each other.

11. The pushrod-pedal coupler according to claim 10, wherein the coupler hinge comprises a hinge pin with a hinge pin axis which is aligned with the coupler hinge axis, a first hinge pin bearing arranged on the pedal-attachment end and a second hinge pin bearing arranged on the pushrod-attachment end.

12. The pushrod-pedal coupler according to claim 11, wherein along the longitudinal axis the first hinge pin bearing is arranged on a first side of a center portion of the pedal-attachment end and a pedal pin bearing for a pin to secure a pedal is arranged on a second side of the center portion of the pedal-attachment end opposite from the first side.

13. The pushrod-pedal coupler according to claim 12, wherein the first hinge pin bearing is arranged in a hinge knuckle portion of the pedal-attachment end.

14. The pushrod-pedal coupler according to claim 12, wherein the pedal-attachment end comprises a first prong extending away from the center portion of the pedal-attachment end and parallel to the longitudinal axis, the first prong including a first bore which is a first part of the pedal pin bearing; and a second prong extending away from the center portion of the pedal-attachment end and parallel to the longitudinal axis and the first prong, the second prong including a second bore as a second part of the pedal pin bearing, wherein the first bore and second bore are aligned with each other and the first prong and the second prong are spaced to accommodate a pedal.

15. The pushrod-pedal coupler according to claim 11, wherein along the longitudinal axis the second hinge pin bearing is arranged on a first side of a center portion of the pushrod-attachment end facing away from the pushrod.

16. The pushrod-pedal coupler according to claim 15, wherein the pushrod-attachment end comprises a first prong arranged on a second side of the center portion opposite from the first side of the center portion of the pushrod-attachment end and parallel to the longitudinal axis, the first prong comprising a first bore which is a first part of the second hinge pin bearing; and a second prong arranged on the second side of the center portion of the pushrod-attachment end and parallel to the longitudinal axis and the first prong, the second prong comprising a second bore which is a second part of the second hinge pin bearing, wherein the first bore and second bore are aligned with each other and the first prong and the second prong of the pushrod-attachment end are spaced to accommodate the first hinge pin bearing of the pedal-attachment end.

17. The pushrod-pedal coupler according to claim 10, wherein the pedal-attachment end is a first clevis comprising two prongs configured to receive a pedal with a pedal pin to secure the pedal to the first clevis and a hinge knuckle opposite the two prongs and receiving a hinge pin of the coupler hinge and wherein the pushrod-attachment end is a second clevis comprising two prongs configured to receive the hinge knuckle of the first clevis and the hinge pin.

18. The pushrod-pedal coupler according to claim 10, wherein the longitudinal axis intersects with the coupler hinge axis and the pedal pivot axis.

* * * * *